United States Patent [19]
Barrall et al.

[11] Patent Number: 5,415,824
[45] Date of Patent: May 16, 1995

[54] METHOD OF PRODUCING PHOSPHATE CERAMIC PIPE CLADDING

[75] Inventors: Jeffery L. Barrall; Debra L. Morris; Carrielee Fidler, all of Lancaster, Pa.

[73] Assignee: Armstrong World Industries, Inc., Lancaster, Pa.

[21] Appl. No.: 186,995

[22] Filed: Jan. 27, 1994

Related U.S. Application Data

[62] Division of Ser. No. 395,618, Aug. 18, 1989, Pat. No. 5,312,657.

[51] Int. Cl.⁶ .................... B29D 7/00; B29C 71/02
[52] U.S. Cl. ........................... 264/212; 264/234
[58] Field of Search ............... 264/236, 257, 212, 234

[56] References Cited

U.S. PATENT DOCUMENTS

| | | | |
|---|---|---|---|
| 4,267,136 | 5/1981 | Bijen | 264/87 |
| 4,344,804 | 8/1982 | Bijen et al. | 156/42 |
| 4,375,516 | 3/1983 | Barrall | 501/84 |
| 4,414,262 | 11/1983 | Hartmann et al. | 428/222 |
| 4,569,878 | 2/1986 | Barrall et al. | 428/182 |
| 4,617,219 | 10/1986 | Schupack | 428/113 |
| 4,778,718 | 10/1988 | Nicholls | 428/287 |

*Primary Examiner*—Christopher A. Fiorilla

[57] ABSTRACT

A pipe cladding composition which is a phosphate ceramic permeating a non-woven fibrous network. The overall thickness of the sheet is between about 5 and about 20 mils. The phosphate ceramic permeates the fibrous network and extends beyond the fibrous network only up to a maximum thickness of about 3 mils across each side of the sheet. The sheets are prepared using wet reaction mixtures which produce phosphate ceramics. These reaction mixtures are mixed and pressed into the non-woven fibrous network which forms a wet sheet that is then cured to provide the cladding material.

14 Claims, 1 Drawing Sheet

METHOD OF PRODUCING PHOSPHATE CERAMIC PIPE CLADDING

CROSS-REFERENCE TO RELATED APPLICATION

This is a divisional of application Ser. No. 07,395,618, filed Aug. 18, 1989, now U.S. Pat. No. 5,312,657.

BACKGROUND OF THE INVENTION

1. Field of the Invention

The present invention relates to pipe cladding sheet materials. Such sheet compositions are used to wrap insulated pipes. Insulation around pipes is held securely in place by these pipe cladding sheet compositions.

2. The prior Art

Presently, pipe cladding which is being used is made from polyvinylchloride. Although polyvinylchloride pipe cladding is puncture resistant and flexible enough to be wrapped around the insulated pipes, the polyvinylchloride is combustible. Even worse, when the polyvinylchloride does burn, it gives off toxic gas.

It would be useful and even advantageous to have a low cost, more fire resistant replacement for the polyvinylchloride pipe cladding.

To function as pipe cladding, however, certain other requirements should be met. Naturally, the composition being used as pipe cladding should wrap the cylindrical volume without breaking or cracking. The material should be in a sheet form and should definitely be relatively easy to handle and install without breaking, puncturing or flaking off the sheet material. For the best versatility in a commercial product, the pipe cladding should be capable of wrapping around a cylindrical volume having a diameter down to 1.5 inches.

Although sheets could be used as pipe wrapping (cladding) without curl memory, pipe cladding should, in its normal position, have a circular curl and have curl memory, so that when it is unrolled or straightened out of its normally cylindrical position, it will reassume a curled position when it is released. This is referred to as "curl memory". Curl memory makes the cladding sheet go around the circular pipe very naturally. This makes it easy to cover the pipe and install the cladding. Curl memory is thus an important requirement for a pipe cladding composition.

It has been discovered that pipe cladding sheet compositions can be prepared using phosphate ceramic. The compositions provided by the instant invention are thin, relatively light in weight, and non-combustible. Due to the thinness of the instant sheet compositions, rolls of these materials can be easily stored and transported. A minimum amount of space is needed for their storage and installation.

Summary of the Invention

The pipe cladding of the present invention comprises a thin sheet which naturally rests in a curled position, and has curl memory. The sheet has a thickness in the range of from about 5 to about 20 mils and comprises a reinforcing non-woven fibrous network and phosphate ceramic which completely permeates the network. The non-woven fiber is itself a sheet-like network and at least some of the fibrous network is made of polymer fiber which is needed for the cladding sheet to have curl memory. Suitably, the non-woven fibrous network is provided by a scrim, mat, or web.

The "curl memory" is the tendency of the pipe cladding to return to its circular, curled position. Sheets without this memory are difficult to install.

The non-woven fibrous network provides the flexibility, reinforcement, and is also used to form the sheet itself. In fact, the fibrous network is largely responsible for giving shape and dimension to the pipe cladding sheet material.

Naturally, if the sheet gets too thin, it will lack the durability, strength, and puncture resistance needed for use or desired for installation, although extremely thin phosphate sheets can be made having outstanding flexibility. The non-woven fiber network inside of a pipe cladding sheet should have a thickness of about 5 mils or greater. Networks of at least about 5 mils in thickness also will have more than the minimum fiber density needed for the cladding.

It has furthermore been found that the phosphate ceramic cannot be allowed by itself in thick layers or thick patches over the surface. While ceramic build-up covering each side of the fibrous network is permitted to some extent, compositions with thicker ceramic build-up are unsuitable for pipe cladding because such materials crack and break too easily when they are handled, used, or bent. Thus, in accordance with the present invention, the permitted thickness of the ceramic covering the fiber is limited to provide the pipe cladding.

It has been pointed out that the instant pipe cladding compositions should not crack or break when they are used. The terms "cracking" or "breaking" are not intended to refer to the fine hairline fractures that will develop in the phosphate ceramic as the cladding sheet is flexed. These terms refer to complete separations, permanent bends, or ceramic loss from the sheet. Pipe cladding can be flexed and curled in a circular manner around a pipe without having permanent breaks, creases, or folds occurring.

The terms "sheet" and "sheet material" are used herein; such terms refer to compositions having the dimensions of breadth and length much larger than the thickness; such compositions are essentially two-sided, each side being called a "face".

DESCRIPTION OF THE DRAWING

The drawing shows a cross-section of the instant pipe cladding. At the surface (1) phosphate ceramic extends beyond the center portion (2). The center portion (2) contains the fibers making up the nonwoven fibrous network and the phosphate ceramic. Two indefinite boundries (3) exist on each side of the nonwoven fiber. This is the point which could be visually recognzied in the pipe cladding as the outermost point to which the fibrous network extends throughout the sheet. Beyond this point, the phosphate ceramic can extend. The thickness of the phosphate ceramic material (1) over and beyond the outermost level of the fibrous network (3) is limited to provide a sheet material which can be wrapped around piping, flexed, and handled without cracking or breaking the cladding material.

DETAILED DESCRIPTION

Figure 1:
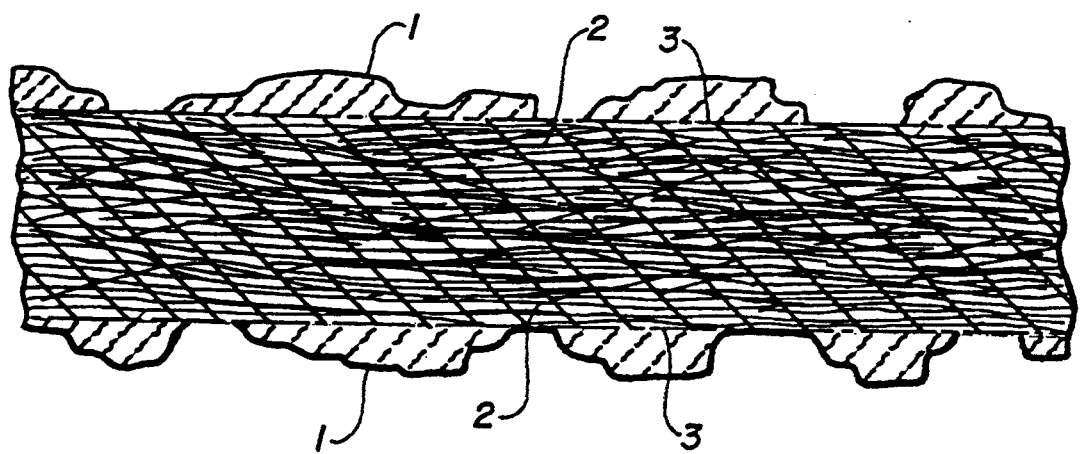

The instant pipe cladding has a non-woven fibrous network. Although conceivably, this network could be provided by laying or stringing continuous fiber into the wet, reacting phosphate ceramic mixture and pressing out a sheet, conveniently and preferably non-woven fibrous scrims, mats, or nets are used to provide either all or part of this network.

Fibrous materials which are woven are less suitable; the looser weaves particularity tend to segment the ceramic; tight weaves are not desired due to lack of permeability. Weakened sheet compositions and those that are prone to crack, break, and flake off bits of the ceramic frequently result.

More than one non-woven scrim can be used. Even if more than one scrim is used, however, the same dimensional limitations will apply. The thickness of the fibrous network is limited to obtain a pipe cladding having the necessary flexibility without the tendency to crack, break, or develop permanent folds and creases. Thus, the non-woven fibrous network inside of a pipe cladding composition preferably should not have a thickness greater than about 16 mils. This is true whether or not the fibrous network is derived from a single or two or more non-woven nets or scrims put together. If more than one scrim is used, they should not rest apart in separate layers. Instead, they should be placed or pressed together to form a single interior network inside the sheet. In preparing the cladding material, it is permissible to ply a thin layer of wet, reacting ceramic mixture between such multiple scrims, but the ceramic must be pressed, worked, or kneaded into them. The ceramic should substantially completely permeate the fiber network throughout, while the scrims are pushed together so that there is a single interior network.

Although the ceramic-fiber mixture does not have to be absolutely homogeneous, it is nevertheless a homogeneous combination to the degree that the cladding material will not have any internal layers of ceramic, and they do not have a "fibrous layer" as such. To the contrary, in the pipe cladding, the phosphate ceramic permeates substantially all of the fibrous network.

The phosphate ceramic which is suitable to form the instant pipe cladding compositions may be produced by a reaction of aqueous phosphoric acid, calcium silicate, and a metal oxide selected from the group consisting of: magnesium oxide, aluminum oxide, zinc oxide, and calcium oxide. A preferred phosphate ceramic can be referred to as calcium magnesium aluminum phosphate; this preferred phosphate ceramic is made with aluminum oxide and magnesium oxide.

This phosphate ceramic material and processes for preparing it is known and has been previously described in references such as U.S. Pat. Nos. 4,375,516 and 4,569,878. The U.S. Pat. No. 4,375,516 reference describes both foamed and non-foamed phosphate ceramic compositions. In the instant case, however, to prepare the pipe cladding sheet compositions, the reactants are mixed to produce the non-foamed phosphate ceramic.

For preferred pipe cladding materials, the phosphate ceramic can be prepared using a phosphate ceramic made by: mixing an aqueous solution of phosphoric acid and aluminum oxide, and thereafter mixing in the calcium silicate (wollastonite) and a metal oxide selected from the group consisting of magnesium oxide, aluminum oxide, calcium oxide, and zinc oxide. Based on 100 parts of calcium silicate, the total of all portions of the metal oxides added can be from about 11 to about 65 parts by weight, and the aqueous phosphoric acid solution, which is from about 35 to 75 by weight of phosphorous pentoxide, can be used in an amount of from about 80° to about 190 parts by weight.

After the ingredients for the phosphate ceramic are mixed, the phosphate material will be "wet" and in the state of reacting and curing to produce a dry, rigid phosphate ceramic. While this reacting mixture is a wet fluid or paste, it can be screeded, pressed, or rolled until the mixture sets (becomes rigid). Before the ceramic sets during curing, this wet mixture and the fibrous network can be worked together (such as by pressure and/or kneading) to form the cladding sheet; and then preferably it is pressed, curled into a circular position before setting, and is then permitted to set and finish curing in the rolled position. Since the fibrous network contains an effective amount of polymeric fiber to have curl memory, cladding sheets made by this process will have curl memory without the need to heat the cladding (and the fiber), and then cool it. Heating and cooling, however, can be done to obtain a stronger, more completely elastic memory.

In preparing the cladding, it is preferred not to use highly dense fibrous networks because it can be extremely difficult to work the wet ceramic into the sheet to the degree required. The fibrous network used should have a porosity high enough to allow the reacting wet phosphate material to permeate the network. The minimum porosity that is effective to allow permeation of the wet phosphate reaction mixture is used to make the cladding. This viscosity will vary depending on other conditions such as the amount of pressure used, the type of processing equipment, amount of kneading performed, and the viscosity of the wet phosphate reaction material.

Non-woven fiber sheets (like scrims and mats) which have a porosity level that will give a minimum reading of about 600 cubic feet per minute (cf m/ft2) measured at 0.5 inch (in.) of water pressure (over atmospheric pressure) in the Frazier air permeability test will be acceptably porous and permeable enough for the wet fluid phosphate cement reaction mixture to penetrate.

A more preferred porosity level, however, is about 800 cf m/ft$^2$ measured by the Frazier air permeability test at 0.5 in. of water pressure. At the higher levels, it will be easier to drive the fluid reaction mixture into the fibrous network. If desired, less pressure, less kneading and/or even a more viscous reaction mixture can be used at these higher levels of permeability.

A preferred non-woven fibrous network has a total thickness in the range of from about 5 to about 16 mils. The phosphate ceramic permeates this network substantially completely and does not entend beyond the fiber surface (beyond its indefinite boundry (3)) more than about 3 mils. These dimensions are needed to insure that the pipe cladding sheet can wrap the smaller pipes without breaking.

Although some sheets, in fact, might be used to wrap cylindrical volumes having only the larger diameters, and thus be able to have a thicker fibrous network, such pipe cladding is not commercially preferred. For reasons of practicality, pipe cladding is used which Willie able to wrap all pipe sizes to be wrapped regardless of whether it is large or small. This avoids the necessity of having to change from one cladding material to another during the course of wrapping (even a single pipe line can vary in diameter). It also avoids the necessity of maintaining different categories of cladding in an inventory. Practically speaking, therefore, a pipe cladding material should be flexible enough to wrap a pipe having the smallest diameter. The smallest diameters should probably be on the order of about 1.5 inches.

If more flexibility is desired, the fibrous network can be made thinner; more preferably, the fibrous network has a thickness less than about 14 mils. If the sheets are too thin, the ceramic can even abrade off just from handling them. Damage such as tears and holes will occur too easily. Thus, although very thin sheets can be formed, it is not suitable pipe cladding. Practically speaking, therefore, the fibrous network should be at least about 5 mils. More preferred thicknesses for the fibrous network are in the range of from about 7 to about 14 mils in thickness or from about 8 to about 12 mils.

The fibrous network will provide enough support for a limited amount of ceramic to extend beyond the fibrous level. Although hairline fractures do tend to form in the ceramic, these fractures can be tolerated, since they will not cause actual breaks, bends, or tears in the sheet, and since they will not result in damage or serious loss of the ceramic from the sheet. Limiting the extension of the ceramic beyond the fiber level is one factor that helps to avoid the tendency to break and crack, causing permanent bends or damage to the sheet. Moreover, when thicker, non-woven fibrous networks are used, the maximum thickness of the ceramic material covering the fiber surface is preferably even thinner to insure flexibility without such breaking. For non-woven fibrous networks having a thickness of from about 7 to about 16 mils, the thickness of the ceramic coverin the fiber will preferably be less than about 2.5 mils. In fact, more preferably, the thickness of the phosphate ceramic that extends beyond the fiber level is limited to a maximum of about 2 mils. The ceramic on each face of the network can be 0 but will not be more than about 3 mils, an acceptable thickness being from 0 to about 3 mils.

When the mixture of calcium silicate, metal oxide, and phosphoric acid is wet, it is fluid and pliable. The viscosity should be sufficiently high to stay in the fibrous network (so that it does not flow out), and it is sufficiently low to penetrate and permeate the fibrous network when the cladding is made. It is a permissible alternative to use a more viscous wet mixture and insure a complete penetration of the fibrous network by increasing the pressure and/or kneading action when combining the wet mixture and fibrous network or even using a more porous fibrous network. It, however, is preferred not to have a wet mixture with a viscosity of greater than about 20,000 cps. At extremely high viscosities, the needed penetration into the fibrous network might not be as good and the pipe cladding quality will be detrimentally effected. Most preferably, therefore, the wet mixture of the aqueous phosphoric acid, calcium silicate, and metal oxide should be used at a viscosity in the range of from about 2,000 to about 12,000 cps. It has been found that the wet phosphate mixtures having viscosities within this range have excellent handling properties for preparing the pipe cladding sheets. Naturally, the higher viscosities, up to about 20,000 and even down to about 12,000 cps, would best be used with thinner or more porous non-woven fibrous networks. Thus, more viscous wet mixtures will be most successfully used and are preferred for the thinner and/or more porous, non-woven fibrous networks.

It has also been found that the best pipe cladding compositions will be produced on a continuous line. In these instances, the fibrous network is preferably provided by at least one non-woven web, mat, or scrim which is continuously pressed with a layer of the wet mixture of aqueous phosphoric acid, metal oxide, and calcium silicate. Thereafter, most preferably, the wet sheet is kneaded. It is then pressed and allowed to cure. The pipe cladding produced from a continuous production line will generally be far superior to pipe cladding produced by batch preparation methods.

In another preferred embodiment, the wet mixture is used at viscosities more preferably in the range of from about 3,000 to about 9,000 CPS and it is continuously spread onto a face of the fiber network. The mixture is pressed into the fiber network, and preferably, the wet phosphate ceramic is then worked further into the network by a series of rollers. When more than one scrim is used, the ceramic is preferably spread between two of them on one face. The amount of ceramic spread onto the fiber preferably is slightly in excess of the amount needed inside the fiber network. The plied layer of the wet, fluid phosphate cement reaction mixture preferably will not be more than about 6 mils thicker than the total thickness of the non-woven fiber network being used. The wet fiber-ceramic sheet is preferably then sent through a press, to smooth out the sheet surface. In addition to smoothing the surface of the sheet, the press (either heated or not heated) can also have raised and lowered areas to put an embossed feature into the wet ceramic of the wet sheet. This will produce a surface-textured cladding sheet. Preferably, the press is heated to speed curing. The final gauge of the cladding sheet can also be set at this point using the press. Preferably, the press will have maximum pressure between its middle point and the end from which the sheet exits. If desired, this could be done with a weighted load. Thereafter, the sheet can be rolled dp to set and finish curing. After it is completely cured, it will be dry and ready to use. The cladding is easily stored or transported in rolls. If desired, carrier paper can be used.

After pressing the wet mixture into the fibrous network, if desired, the wet, fiber-ceramic sheet can be given enough heat to raise its temperature to a point in the range of from about 53° to about 65° C. in order to speed the curing.

At least two methods can be used to put curl memory into the pipe cladding composition. One is by heating the sheet when it is in the desired curled position. Another is to cure and set the ceramic while the sheet is rolled. Preferably, both are used. Heating can even be done to the wet cladding composition of phosphate ceramic and fibrous network as the wet reaction mixture cures to form the rigid, phosphate ceramic.

The amount of heat which is used must be effective to heat but not soften the synthetic polymer fibers inside the sheet while it is curled or rolled up. After the polymer fibers have heated, but not melted, the sheet is cooled before allowing the sheet to be unrolled. This heating step can be done before, during, or after curing and setting of the cladding composition. It can even begin before setting of the phosphate ceramic takes place, and finish during or after curing.

Since the cladding sheet has a curve, unless it is held down, it will not rest in a flat position even if it is cut into short pieces. Short pieces of the cladding sheet will have the form of an arc in the direction of its curved surface. Longer pieces of the cladding sheet will curl, to completely form a circle or circular roll. Thus, with the curl and the curl memory, the pipe cladding sheet will rest in a cylindrical position when the sheet has a sufficient length to form a circle.

Even if the curve is slight so that the diameter of the naturally formed circle is large (up to two feet or even more), the sheet will still be flexible enough to wrap a 1.5 diameter pipe without cracking or breaking. Preferably, however, the cladding sheet is given a curl that will allow the sheet to naturally form circular shapes with a diameter less than about 10 in. Most preferably, it will naturally curl into a circle with a diameter less than about 5 in. The cladding sheets that curl into the smaller, tighter circles readily and naturally are easier to install, and will fit better around the pipe.

For the sheet composition to have curl memory, an effective amount of the fibers in the network will be made of a polymer (including copolymers). This is true regardless of the method used to get the curl and memory into the cladding sheet. The pliability of the polymer fibers is required. Preferably, at least about 65% by weight of the fiber in the nonwoven fibrous network is made of polymer. More preferably, polymer fiber will be used for all of the non-woven fibrous network.

Preferably, the polymer has a glass transition temperature less than about 350° C. Although it is not necessary that the polymer actually be heated to the softening point. Heating below the softening point is sufficient to set the curl memory. Preferably, the synthetic fiber will have a glass transition temperature in excess of about 90° C.; the glass transition temperature can be in the range of from about 90° to about 350° C. Fibers which can be heated to set the curl memory can, for example, be made of a member selected from the group consisting of: polyvinyl chloride, polyamid, polypropylene, polyester, polyethylene, polyolefin, polyvinyl-alcohol, acrylic polymers and copolymers, acetate polymers and copolymers, and fluorocarbon polymers and copolymers. More preferably, the fibers will be made of a material selected from the group consisting of: polyester and polypropylene.

Although it is permissible to have a small amount of fiberglass in the non-woven fibrous network, this is not preferred. Fiberglass tends to be more brittle and is too rigid. Sheets made with non-woven fiberglass networks, moreover, cannot be given the needed curl memory even if the ceramic sets and cures while the sheet is in a rolled position. Such sheets also will lack the needed pliability for pipe cladding.

Fortunately, the phosphate ceramic itself is a very non-flammable composition and with this ceramic permeating the fiber, even more flammable fibers can be used. Surprisingly, in fact, even though flammable fibers are used, the pipe cladding sheets are surprisingly fire resistant due to the complete permeation of the phosphate ceramic throughout and over the fibrous network.

When the pipe cladding is needed, it can be unraveled and coiled around the insulated pipe. The loose seams of the pipe cladding can be secured by such means as an adhesive, rivits, staples, or by ties which are placed around the cladding.

If desired, a coating composition can be put over the top of the phosphate ceramic to improve handle-ability and improve the feel of the pipe cladding sheet when it is touched. This could also be desired as a vapor barrier. Any coating material such as resins or latexes could be used. For example, an acrylic latex or resin could be used. The thickness of the coating is not critical; such coatings are normally thin, having the approximate thickness of a paint coating. The coating will not require a change in the dimensions of the cladding sheet. The cladding could even be painted. If desired, dyes or pigments could be mixed into the phosphate ceramic mixture to give the cladding color.

The Examples which follow are offered to illustrate the instant invention and should not be taken to limit it. All parts and percentages are by weight unless otherwise indicated.

EXAMPLES

Preparation of the Wet Ceramic Mixture

The wet phosphate ceramic mixtures for the following examples were made according to the following formula:

| Ingredient | Parts By Weight (Wt.) |
|---|---|
| $Al_2O_3.3H_2O$ | 7.2 |
| $MgO$ | 4 |
| $CaSiO_3$ | 58 |
| 75% $H_3PO_4$ (53.0% $P_2O_5$) | 54.2 |
| $H_2O$ | 8.6 |

The wet ceramic mixture was prepared by mixing the phosphoric acid, the aluminum oxide, and the water until a clear solution was obtained. Then the solution was cooled to 4° C. and a mixture of the MgO and wollastonite (calcium silicate) was added with vigorous mixing in an air stirrer. The phosphate ceramic prepared using this formula can be referred to as a calcium aluminum magnesium phosphate. Although this preparation is most preferred, other preferred ceramics can also be prepared using different concentration ratios, sequences of addition and/or even other metal oxides.

Example 1

A drawdown of the previously described wet ceramic mixture was made onto a polyester scrim (2011 from DuPont) that was 12×12 in. The scrim was 1 oz/sq. yd. and was 7 mils thick. The drawdown was made at a thickness of 12 mils over the face of the fiber. To force the wet ceramic mixture into the fibrous network, it was then pressed for two minutes at 75 psi, simultaneously it was heated at 180° F. to speed the reaction. It was then removed. When the ceramic finished curing, the sheet could be wrapped around a 1.5 inch diameter pipe without cracking and without permanent breaks.

To give the composition curl memory, the sheet would be rolled and put into an oven at a temperature in the range of from about 125° to about 230° C. for about 0.5 to about 4 minutes to heat the polyester (it should not actually soften). It would then be removed and cooled.

The dried, cured sheet of this example was 11 mils thick. The ceramic-fiber mixture inside was, of course, 7 mils thick, and the ceramic covered the fiber on each side in a thin coat which was probably 2-2.5 1.85-2.2 mils thick (averaging 2 mils in thickness) over each face.

Example 2

The previously described wet mixture was used according to the procedure set forth in Example 1 to make a pipe cladding sheet. A non-woven polypropylene scrim 1.4 oz/sq. yd. and 8 mils thick (from DuPont) was used as the non-woven fibrous network. The finished sheet could wrap a 1.5 inch diameter pipe without breaking or cracking, and was 11 mils thick.

Example 3

This example demonstrates the preparation of pipe cladding that used two plies of a 4 mil thick polyester scrim to provide the non-woven fibrous network.

The non-woven polyester scrim (2250 polyester from DuPont) which was 1 oz/sq. yd. was coated with a 12 mil drawdown of the formula previously described. A second ply of the same type of polyester scrim was placed on top of the drawdown and the sample was immediately pressed at 180° F. and 75 psi for two minutes. This drove the wet ceramic into the scrims and forced the scrims together. When the sample was removed, it had a thickness of 12 mils. It contained a non-woven fibrous network of approximately 8 mils thick. It was noted that the sheet had a thin ceramic coating on each side which covered the fiber. It is estimated that the coating on each side ranged between about 1.9 and about 2.1 mils thick. It had a tensile strength of 650 psi, and could be wrapped around a 1.5" diameter pipe without cracking.

Example 4

The pipe cladding sheet material was prepared on a continuous production line. A single ply of 7 mil thick polyester scrim (2011-DuPont) was used to provide the non-woven fibrous network. The previously described wet phosphate ceramic mixture was drawn down onto a face of the scrim at a thickness of 9 mils. The ingredients for the wet phosphate mixture were continuously mixed on a Respecta mixer and continuously plied onto the scrim using a roll coater. The coated scrim was pulled through a series of rollers which served to knead and work the wet mixture forcing it into the network. From there, the sheet was pulled (at an 11 second residence time), into a flat, heated press which ironed the material smoothing the ceramic on each side of the scrim, and which finished the sheet to a final gauge. The press was maintained at an overall temperature of 155° F., and had a 500 lb. load centered 4.5 cm from the end out of which the sheet exited. Thereafter, the sheet was pulled into and through a set of laminating rollers and from there was rolled onto a roller. The ceramic in the sheet had not set and was still curing. After approximately two minutes, the ceramic had set.

When strips of the sheet were cut from the roll and were flattened out, the sheet material would return to its circular, curled position. Thus, the pipe cladding was given memory by maintaining the sheet in a circular roll as the phosphate ceramic mixture cured and set.

Although the cladding sheet did have memory, if desired, the rolled pipe cladding sheet could be heated as indicated previously. After from about ½ to 4 minutes, the cladding would be removed from the heat, and the memory would be even stronger.

Example 5

Using the procedure generally described under Example 4, a pipe cladding sheet was prepared using two plies of a 4 mil thick polyester scrim (2250-DuPont). The same continuous line apparatus was used as was used for Example 4. In this example, however, the previously described, wet phosphate mixture was drawn down on the face of one scrim at a thickness of 11 mils. The second scrim was continuously plied onto the wet mixture. The scrims were forced together and the wet ceramic mixture was worked through each scrim and out over the outer face of each scrim by passing the scrim-ceramic mixture sheet composition through the series of rollers. The wet sheet then passed through (at 11 seconds residence time) a press heated to 150° F. to iron the ceramic mixture which coated each outer surface, set the gauge of the final sheet thickness, and speed curing. A 500 lb. load was used while pressing. The sheet thereafter went through the laminator and thereafter was rolled up onto a roller. Since the wet ceramic was still curing, the cladding sheet would, after curing, have curl memory. In this case, however, the cladding sheet material was placed into an oven set at a temperature of 134° C. for a time of 3 minutes. After this time, the Poll of pipe cladding was removed. The cladding sheet had an overall thickness ranging between 12 and 13 mils, a natural curl that allowed it to rest in a cylindrical position, and curl memory.

The pipe cladding prepared under this example was also tested for its ability to wrap piping. It was found that the sheet material could wrap around a 1.5 inch diameter pipe without breaking.

Cure Memory Test

When a meter long strip (about 4–6 inches wide) of the finished pipe cladding sheet was cut from the roll, the curl memory was tested by securing one end, and allowing the curled sheet to drop in a vertical direction (by gravity). The curl memory was so strong that the sheet rolled back up into its circular position. Pipe cladding sheet materials which were given curl memory by rolling the sheet while the ceramic mixture cured were also given this test for the curl memory. It was noted that such sheets also rolled up and returned to the circular, curled position.

Example 6

This is a comparison example which is offered to show that glass fiber cannot be used as the non-woven fibrous network for pipe cladding materials. Even though the sheet might be curled as the phosphate ceramic cures, such sheets will not return to the circular, curled position using the test method described under Example 5.

A single ply of a fiberglass mat which weighed 4 oz per linear measurement (from Superior Glass Company) was coated with a 12 mil draw down of the previously described wet ceramic mixture. The sample was pressed at 75 psi and heated to 180° F. for two minutes forcing the wet ceramic through the fiberglass and out onto the other side. The sheet was then rolled up into a circular position while the phosphate ceramic cured, set, and dried.

The finished sheet had a thickness of 12 mils and could wrap a 3 inch diameter pipe without cracking.

A strip of the sheet was given a test for its curl memory by holding it in its rolled position, and releasing the sheet while one end was secured. The sheet unraveled, falling downward. The end of the sheet, however, did not recoil and thus, was unable to retain its curl memory.

A portion of this sheet was cut away from the roll and was examined for flexibility. The sheet was not as flexible as the other materials made with polyester or polypropylene fibrous networks. It was also noted that glass fibers were exposed at the cut edges which gave the material poor handling properties.

What is claimed is:

1. A method for preparing a phosphate ceramic pipe cladding sheet having curl memory, comprising, pressing together (i) a two-faced, non-woven fibrous network which contains polymeric fiber, the network having a minimum thickness of about 5 mils and (ii) a wet mixture of calcium silicate, an aqueous phosphoric acid solution, and a metal oxide selected from the group consisting of aluminum oxide, magnesium oxide, calcium oxide, and zinc oxide, so that the wet mixture permeates the fibrous network and a wet sheet is formed; placing the wet sheet in a cylindrical, rolled position; and curing the wet mixture to form the phosphate ceramic pipe cladding which has a total thickness in a range of from about 5 to about 20 mils, further providing that phosphate ceramic covers each face of the fibrous network in a thickness of up to about 3 mils.

2. A method as described in claim 1 wherein the polymeric fiber includes heat softenable fibers and wherein, the wet sheet is heated in the cylindrical position as it cures so that the heat softenable fibers are heated but not softened.

3. A method as described in claim 1 wherein the wet sheet is heated while it is in the cylindrical, rolled position.

4. A method as described in claim 1 wherein a series of rollers are used to press together the non-woven fibrous network and the wet mixture.

5. A method as described in claim 1 wherein the wet sheet is pulled through a press before curing to give the wet mixture a smooth surface and give the sheet a final gauged thickness.

6. A method as described in claim 5 wherein the press is heated.

7. A method as described in claim 5 wherein the press also puts an embossed feature into the wet sheet.

8. A method as described in claim 1 wherein a continuous production line is used to form the wet sheet.

9. A method for preparing a phosphate ceramic pipe cladding having curl memory comprising 1) pressing together (i) a two-faced, non-woven fibrous network which contains polymeric fibers which are heat softenable, the network having a minimum thickness of about 5 mils and (ii) a wet mixture of calcium silicate, an aqueous phosphoric acid solution, and a metal oxide selected from the group consisting of aluminum oxide, magnesium oxide, calcium oxide, and zinc oxide, so that the wet mixture permeates the fibrous network and a wet sheet is formed; 2) curing the wet mixture to form a phosphate ceramic sheet composition having phosphate ceramic on each face of the fibrous network at a thickness of up to about 3 mils wherein the phosphate ceramic sheet has a total thickness in a range of from about 5 to about 20 mils; and 3) placing the phosphate ceramic sheet in a cylindrical, rolled position and heating the phosphate ceramic sheet to obtain the phosphate ceramic pipe cladding, further providing that the heat softenable polymeric fibers are heated but not softened.

10. A method as described in claim 9 wherein a series of rollers are used to press together the non-woven fibrous network and the wet mixture.

11. A method as described in claim 9 wherein the wet sheet is pulled through a press before curing to give the wet mixture a smooth surface and give the wet sheet a final gauged thickness.

12. A method as described in claim 11 wherein the press is heated.

13. A method as described in claim 11 wherein the press also puts an embossed feature into the wet sheet.

14. A method as described in claim 9 wherein a continuous production line is used to form the wet sheet.

* * * * *